US012704141B2

(12) United States Patent
Strippoli

(10) Patent No.: US 12,704,141 B2
(45) Date of Patent: Aug. 11, 2026

(54) ELECTROMECHANICAL TELESCOPIC COLUMN ASSEMBLY

(71) Applicant: FIRECO S.R.L. A SOCIO UNICO, Gussago (IT)

(72) Inventor: Giancarlo Strippoli, Gussago (IT)

(73) Assignee: FIRECO S.R.L. A SOCIO UNICO, Gussago (IT)

( * ) Notice: Subject to any disclaimer, the term of this patent is extended or adjusted under 35 U.S.C. 154(b) by 271 days.

(21) Appl. No.: 18/707,202

(22) PCT Filed: Nov. 12, 2021

(86) PCT No.: PCT/IB2021/060502
§ 371 (c)(1),
(2) Date: May 3, 2024

(87) PCT Pub. No.: WO2023/084294
PCT Pub. Date: May 19, 2023

(65) Prior Publication Data
US 2026/0160287 A1 Jun. 11, 2026

(51) Int. Cl.
*F16B 7/00* (2006.01)
*F16B 7/10* (2006.01)
(Continued)

(52) U.S. Cl.
CPC ......... *F16B 7/105* (2013.01); *F16H 25/2056* (2013.01); *F16M 11/28* (2013.01)

(58) Field of Classification Search
CPC ...... F16H 25/20; F16H 25/2056; F16B 7/105; F16M 11/28; F16M 11/18; F16M 11/046; F16M 11/26; F16M 2200/047
See application file for complete search history.

(56) References Cited

U.S. PATENT DOCUMENTS 5,660,495 A * 8/1997 Atsukawa ................. F16B 7/10
403/374.1
7,458,562 B1 * 12/2008 Chen ......................... B66F 3/10
254/2 B
(Continued)

FOREIGN PATENT DOCUMENTS

DE 3630746 C1 2/1988
WO 2009058241 A2 5/2009
WO 2020236114 A1 11/2020

OTHER PUBLICATIONS

International Search Report, issued in PCT/IB2021/060502, mailed Jun. 15, 2022, Rijswijk, NL.

*Primary Examiner* — Zakaria Elahmadi
(74) *Attorney, Agent, or Firm* — ArentFox Schiff LLP; Michael Fainberg

(57) ABSTRACT

An electromechanical telescopic column assembly has a base, movement members having a driving screw, and a plurality of tube assemblies configurable between a compact configuration and an extended configuration and having a head tube assembly, a main intermediate tube assembly and a base tube assembly. The head tube assembly has a head tubular member and a head piston having a head horizontal latch. The main intermediate tube assembly has a main intermediate tubular member and a main intermediate piston. In the compact configuration, the driving screw engages the head piston and keeps the head horizontal latch in an unlocked position, in which the head tubular member is disengaged from the main intermediate tubular member. A disengagement of the head piston from the driving screw allows the head horizontal latch to translate from the unlocked position to a locked position, in which the head tubular member is locked to the main intermediate tubular member.

18 Claims, 10 Drawing Sheets

(51) Int. Cl.
*F16H 25/20* (2006.01)
*F16M 11/28* (2006.01)

(56) References Cited

U.S. PATENT DOCUMENTS

| | | | | |
|---|---|---|---|---|
| 7,712,389 | B2 * | 5/2010 | Wang | F16H 25/20 254/102 |
| 2015/0075306 | A1 * | 3/2015 | Castelli | F16H 25/20 74/89.35 |
| 2016/0301128 | A1 * | 10/2016 | Blackwelder | E04H 12/003 |
| 2017/0225320 | A1 * | 8/2017 | Swift | F16M 11/28 |
| 2019/0368216 | A1 * | 12/2019 | Young | F16B 7/105 |
| 2021/0048142 | A1 * | 2/2021 | Knepple | F16B 21/04 |
| 2024/0156560 | A1 * | 5/2024 | Do | A61B 50/15 |

* cited by examiner 75
76
66
55
V
50''
65
76
75
86
86
85
85
80''
702
802
602
5
70''
6
60''
7
8
50
60
601
30''
70
80
30
T
52
601
570
50'
51
57
570
30'
60'
61
670
701
67
60'
61
3
70'
701
62
71
80'
72
81
B
31
82
2

86
76
66
V
55
65
75
85
702
802
602
63'
50
60
1
80
70
73
30"
520
601
30
T
54
53
52
57
620
64
63
62
67
VIII
701
72
30'
71
81
82
2

ELECTROMECHANICAL TELESCOPIC COLUMN ASSEMBLY

CROSS-REFERENCE TO RELATED APPLICATIONS

This application is a National Phase Application of PCT International Application No. PCT/IB2021/060502, having an International Filing Date of Nov. 12, 2021 which is hereby incorporated by reference in its entirety.

FIELD OF THE INVENTION

The present invention relates to the field of telescopic columns, in particular the object of the present invention is an electromechanical telescopic column assembly for supporting and moving military, communication, lighting and/or surveillance equipment.

In this case, the electromechanical telescopic column is a lifting apparatus suitable for lifting equipment that has previously been installed and made integral with one head end of the telescopic column. Since it is integral with the column, the equipment may not be disengaged when lifted.

BACKGROUND OF THE INVENTION

Prior-art electromechanical telescopic columns provide for the locking of two successive tubular members, also referred to as “extensions”, to take place by means of a horizontal latch placed on a ring at the end of each extension, so that the horizontal latch of the following extension engages a respective seat obtained in the preceding extension. It should be clear that the engagement of the horizontal latch in the respective seat allows two consecutive tubular members to be locked together.

This solution, however, has some drawbacks, in fact the locking takes place from the outside towards the inside, because the ring placed at the end of each extension projects radially with respect to the radial dimensions of the tubular member itself, so as to allow the horizontal latch to move between a column movement configuration and a locking configuration, wherein the translation of the horizontal latch engages the respective seat obtained in the preceding extension. It should be clear that the preceding tubular member is blocked by the following tubular member.

Furthermore, it is necessary to consider that the ring is an extremely delicate portion, as it ensures the locking. The ring and the complex system of horizontal and vertical latches, being positioned externally so as to project radially outwards, are constantly exposed to the external environment and to all atmospheric agents, i.e. sunlight, rain, wind, snow, etc.

A further drawback arises from the fact that, in military applications in desert areas, the possible presence of sand carried by the wind may compromise the functionality of the horizontal latch.

For the purposes of this discussion, it is specified that the term “preceding” extension refers to the tubular member with a diameter immediately lower than the one considered, i.e. housed coaxially therein. On the other hand, the term “following” extension refers to the tubular member with a diameter immediately greater than the one considered.

SUMMARY OF THE INVENTION

The object of the present invention is to propose a telescopic column assembly in which the locking of the tubular member occurs from the inside towards the outside.

Said object is achieved by a telescopic column assembly, an extension method and a retraction method as described and claimed herein. Preferred embodiments of the present invention are also described.

BRIEF DESCRIPTION OF THE FIGURES

The features and advantages of the telescopic column assembly according to the invention will also become apparent from the description hereinbelow of its preferred embodiments, given by way of non-limiting example, with reference to the appended figures, wherein.

DETAILED DESCRIPTION

Figure 1:
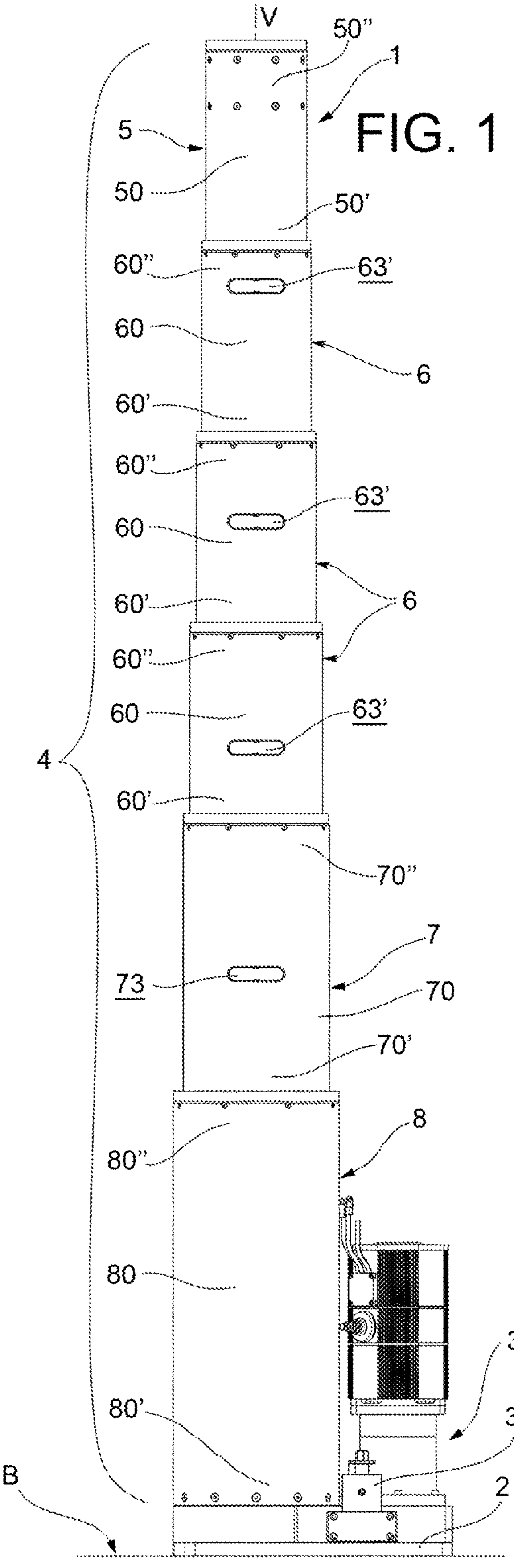
FIG. 1 is a front view of a telescopic column assembly in an extended configuration.
Figure 1A:
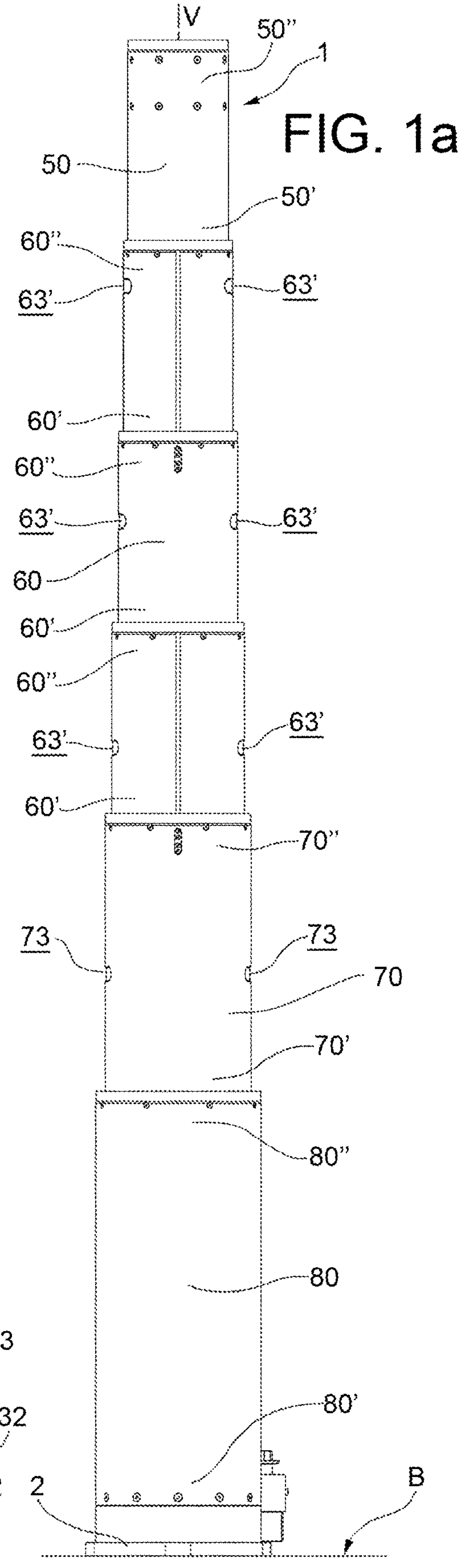
FIG. 1*a* is a front view of the telescopic column assembly of FIG. 1 according to a different angle.
Figure 2:
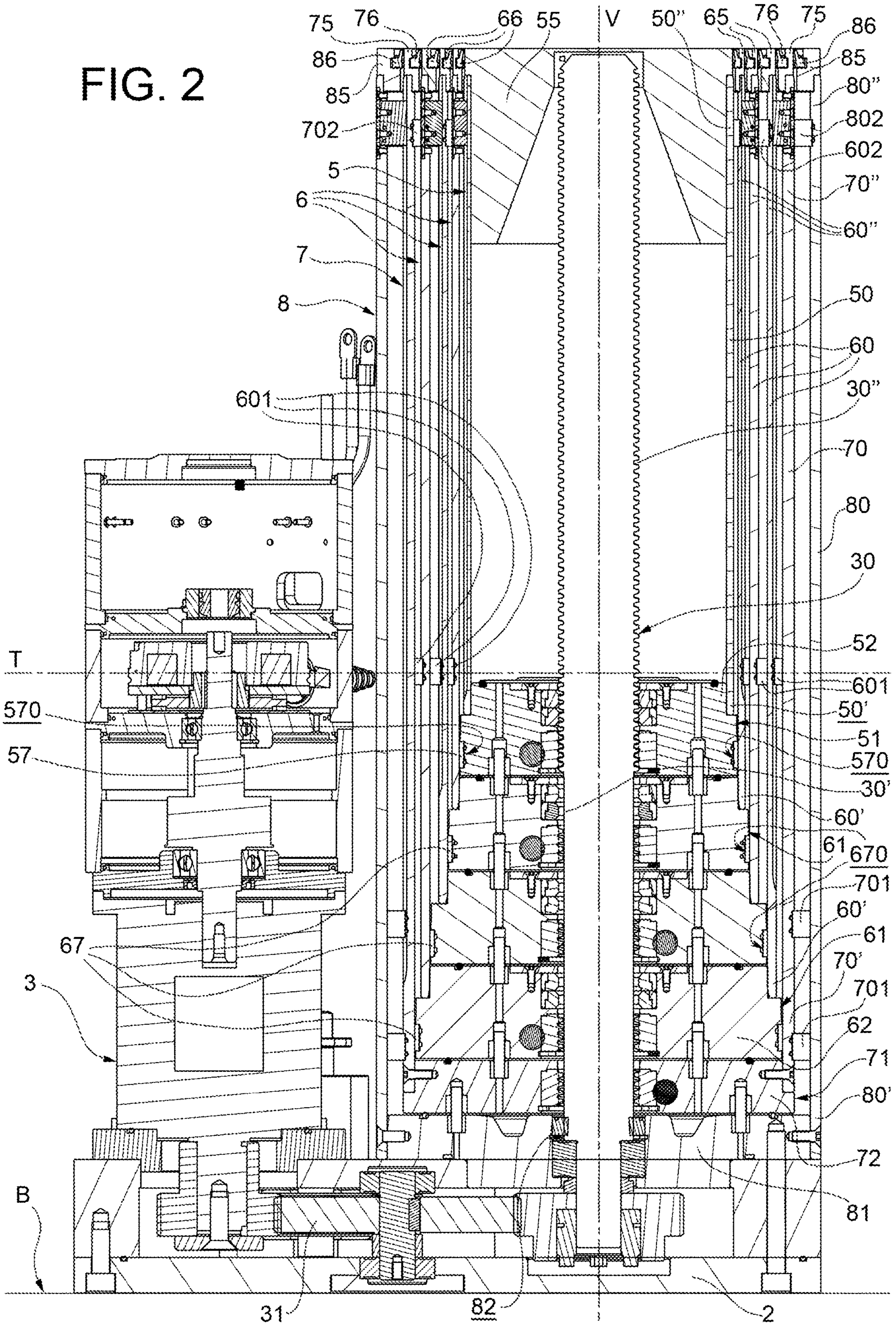
FIG. 2 is an axial section of the telescopic column assembly in a compact configuration.
Figure 3:
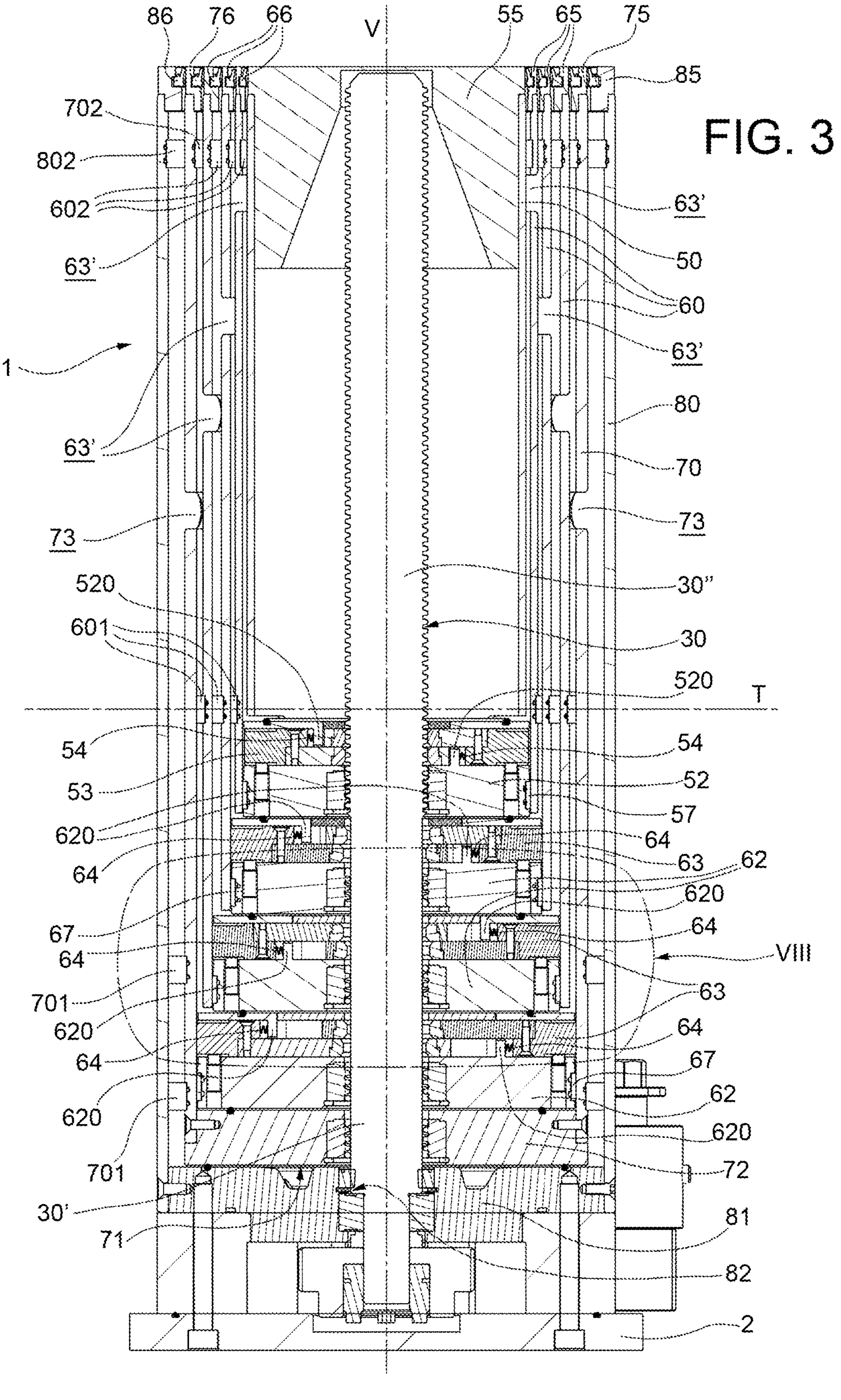
FIG. 3 is an axial section of the telescopic column assembly in a compact configuration according to a different angle with respect to that of FIG. 2.
Figure 4:
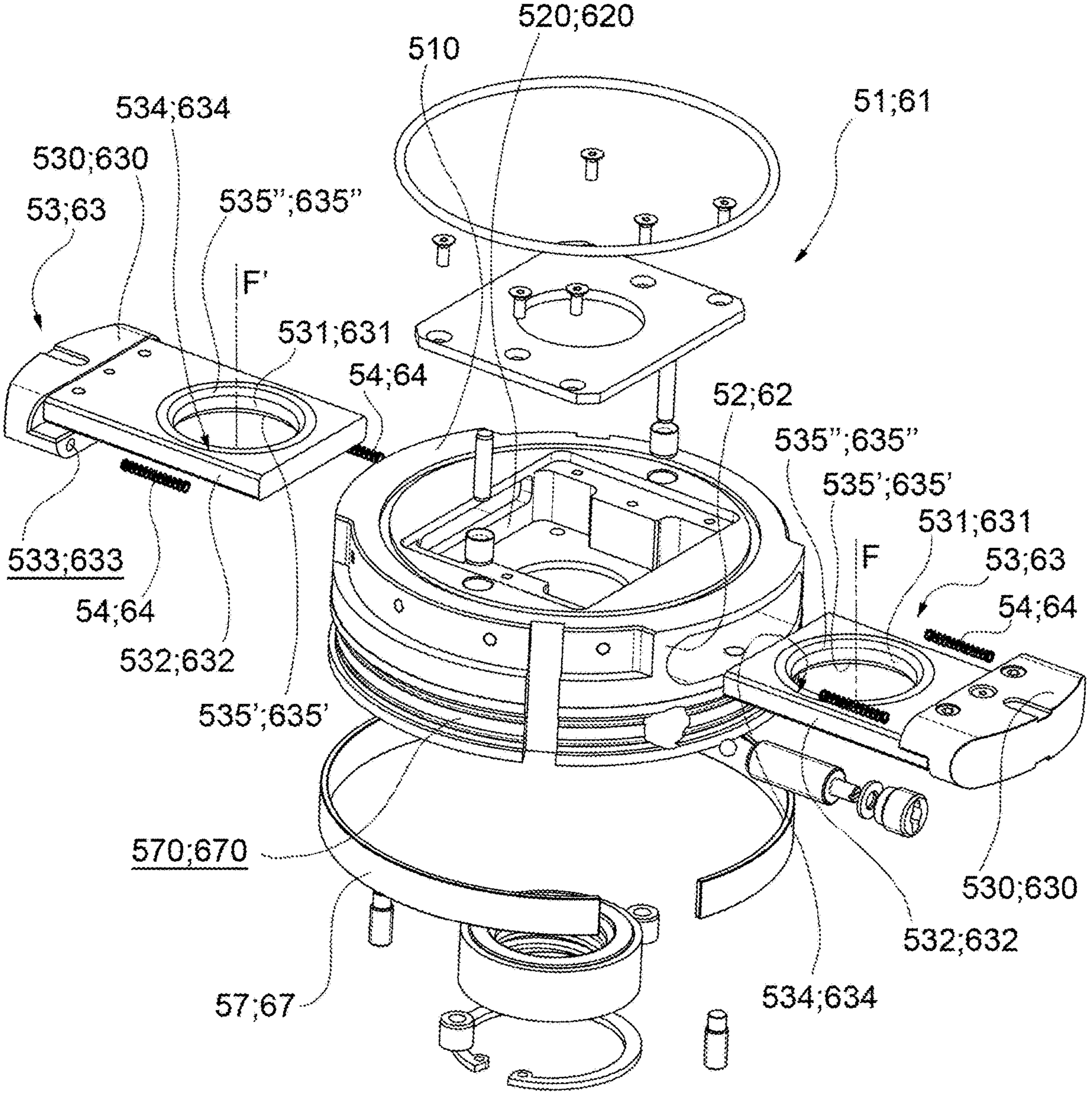
FIG. 4 is a perspective figure with separate components of a head piston or of an intermediate secondary piston.
Figure 5:
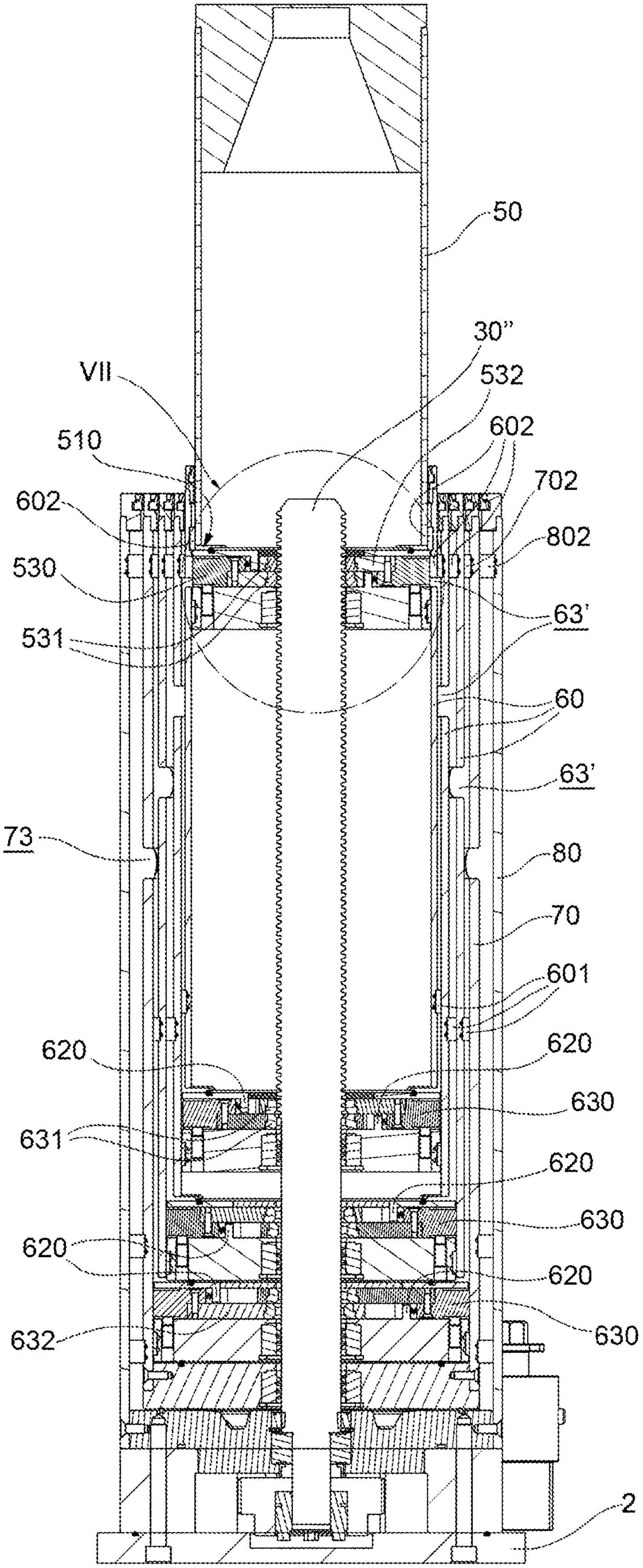
FIG. 5 is a front view of a head tube assembly being partially extended.
Figure 5A:
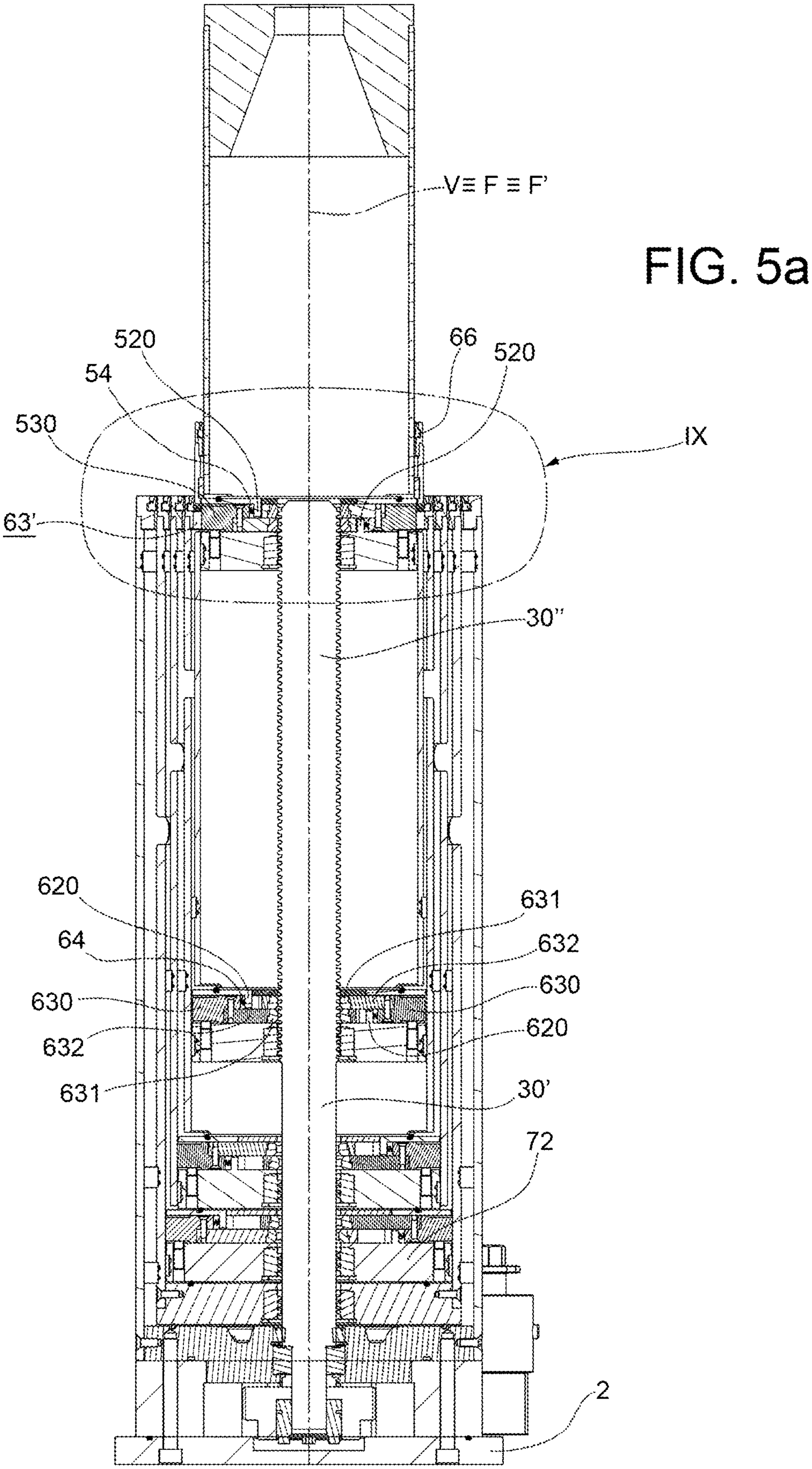
FIG. 5*a* is a front view of the head tube assembly being fully extended.
Figure 6:
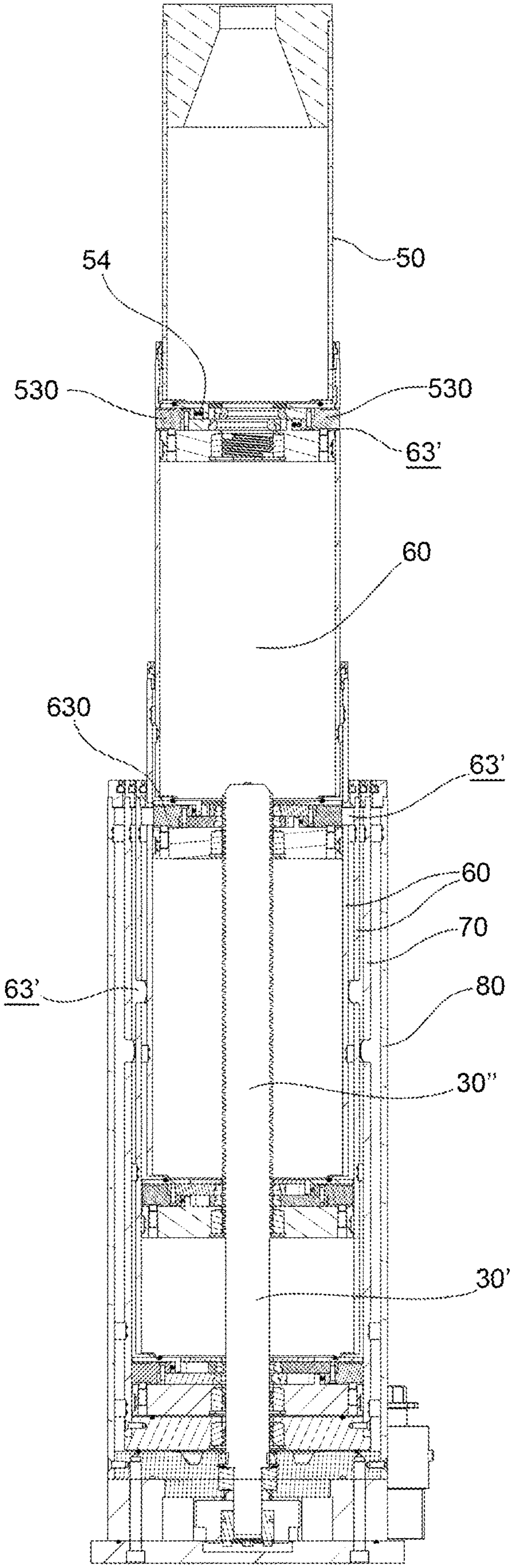
FIG. 6 is a front view of the head tube assembly and a secondary intermediate tube assembly being fully extended.
Figure 7:
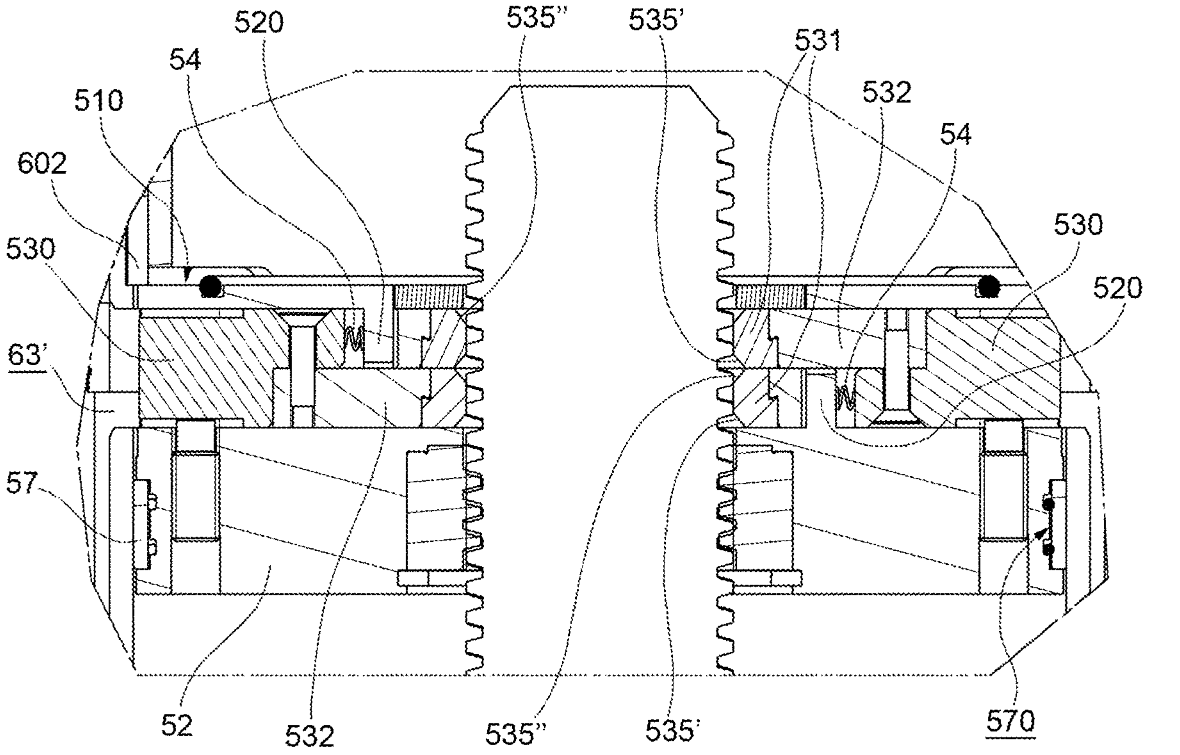
FIG. 7 is an enlarged view of the detail VII in FIG. 5.
Figure 8:
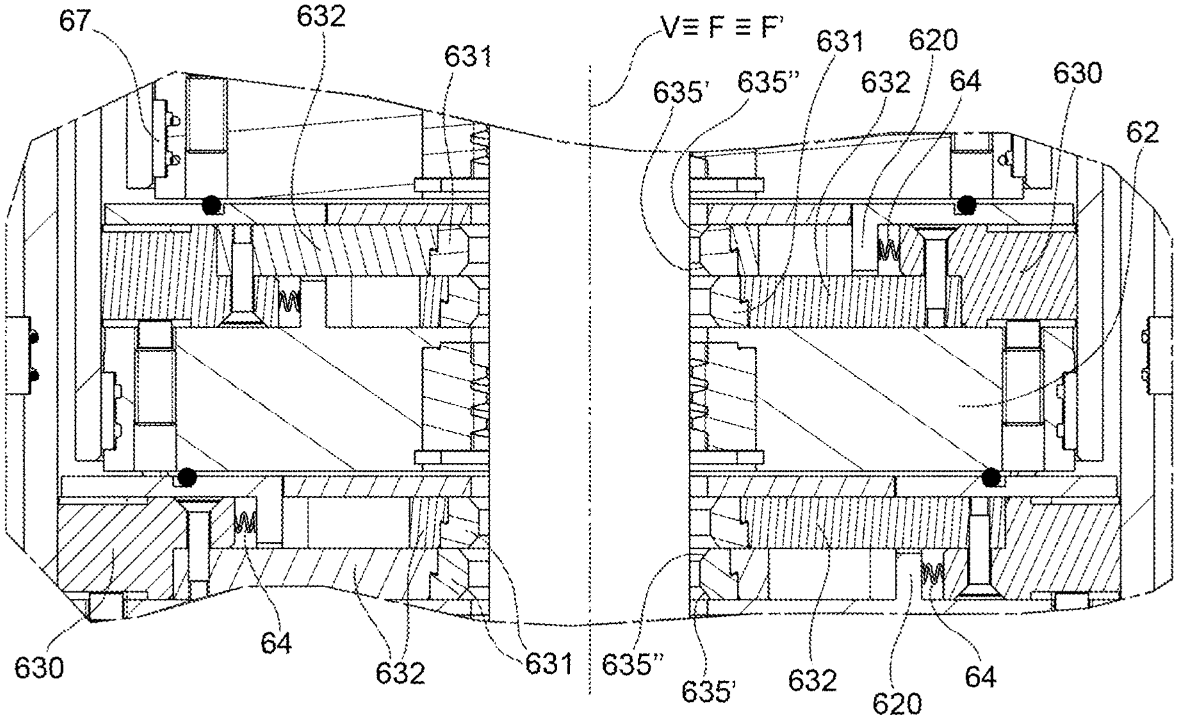
FIG. 8 is an enlarged view of the detail VIII in FIG. 3.
Figure 9:
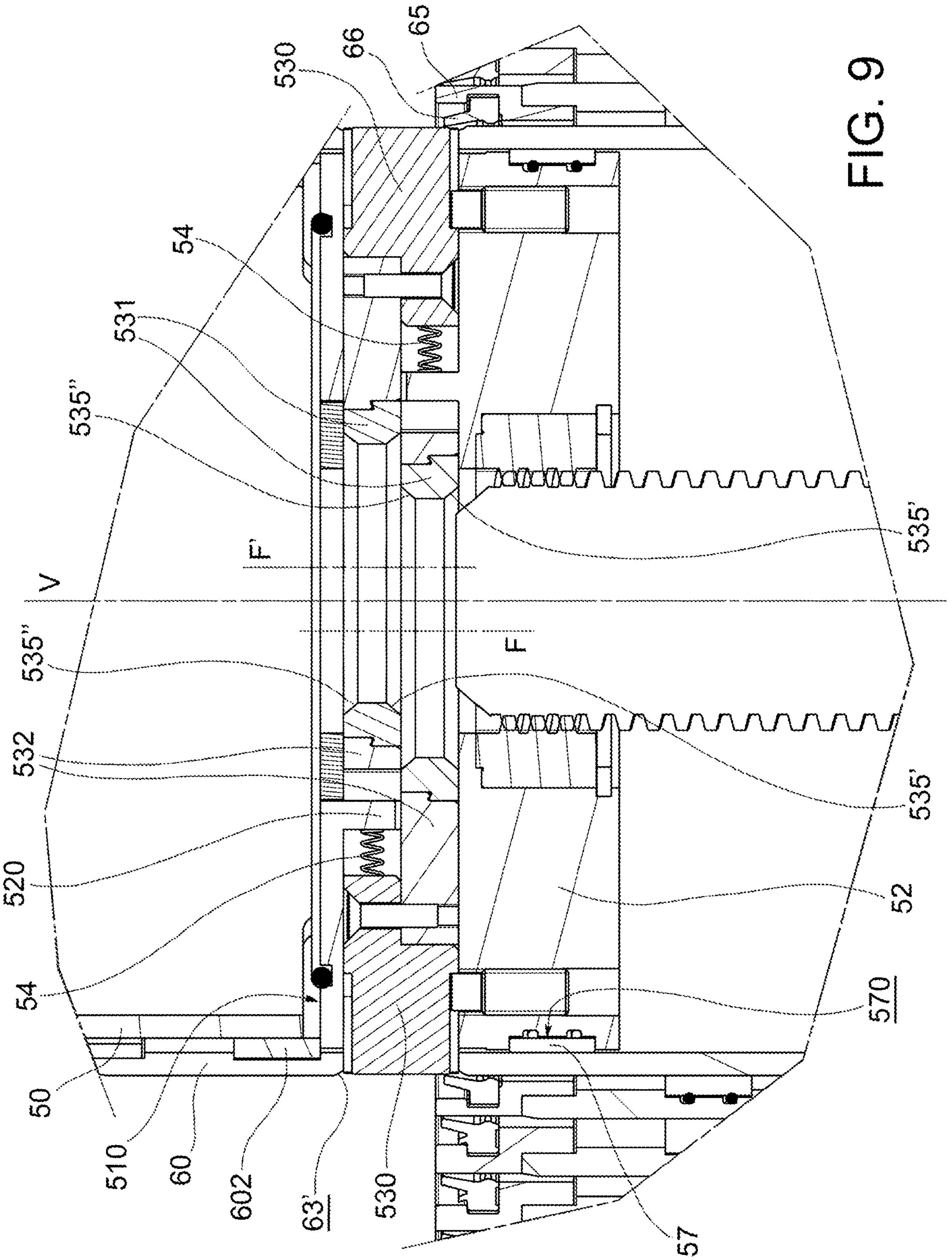
FIG. 9 is an enlarged view of the detail IX in FIG. 5*a;*
Figure 10:
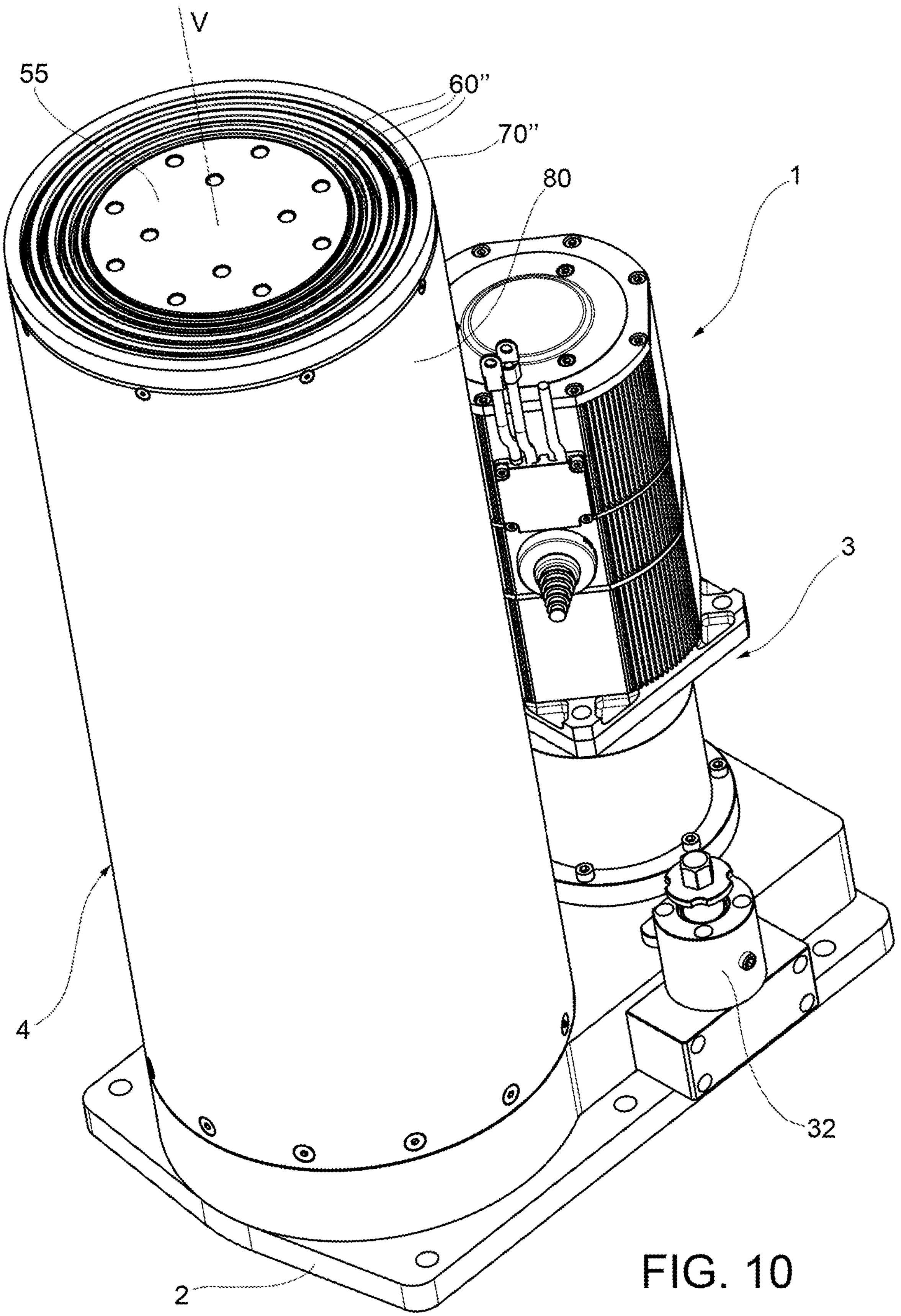
FIG. 10 is a perspective view of the telescopic column assembly in a compact configuration.

In said drawings, a telescopic column assembly according to the invention has been collectively indicated with 1.

In the following description, elements common to the various embodiments illustrated in the drawings are indicated with the same reference numerals.

In accordance with the present invention, the electromechanical telescopic column assembly 1 is suitable for supporting and moving military, communication, lighting and/or surveillance equipment. Such telescopic column assembly extends along an axis V and comprises a base 2 suitable for resting on a base plane B, movement means 3 and a plurality of tube assemblies 4.

The movement means 3 comprise a driving screw 30 which is oriented along the axis V.

The tube assemblies 4 are telescopically configurable along the axis V between a compact configuration and an extended configuration.

Preferably, the tube assemblies 4 are arranged concentrically.

In accordance with the invention, such plurality of tube assemblies 4 comprises a head tube assembly 5, a main intermediate tube assembly 7 and a base tube assembly 8.

The head tube assembly 5 in turn comprises a head tubular member 50 and a head piston 51.

The head tubular member 50 extends between a lower end of head tubular member 50' and an upper end of head tubular member 50''. The head piston 51 is attached to the lower end of head tubular member 50' and may be engaged with the driving screw 30.

Such head piston 51 comprises a head piston body 52, at least one head horizontal latch 53, and at least one head elastic member 54.

The head elastic member 54 is preferably arranged orthogonally to the axis V.

In accordance with the invention, such head elastic member 54 elastically connects the head piston body 52 with the head horizontal latch 53, so as to cause the head horizontal latch 53 to move.

The main intermediate tube assembly 7 comprises a main intermediate tubular member 70, a main intermediate piston 71 and a main intermediate ring 75.

The main intermediate tubular member 70 extends between a lower end of main intermediate tubular member 70' and an upper end of main intermediate tubular member 70". Such main intermediate tubular member 70 has at least one seat 73 suitable for receiving the head horizontal latch 53.

Preferably, the main intermediate tubular member 70 houses at least a the driving screw 30 therein.

The main intermediate piston 71 is engaged with the driving screw 30 and is attached to the lower end of main intermediate tubular member 70'. In particular, such main intermediate piston 71 comprises a main intermediate piston body 72.

The main intermediate ring 75 is attached to the upper end of main intermediate tubular member 70" and comprises at least one main intermediate sealing member 76 engageable with the head tubular member 50.

For example, the main intermediate sealing member 76 is a gasket, in this case a lip gasket.

The base tube assembly 8 comprises a base tubular member 80, a bottom 81 and a base ring 85.

The base tubular member 80 extends between a lower end of base tubular member 80' and an upper end of base tubular member 80".

The bottom 81 is attached to the base 2 and has a hole 82 where the driving screw 30 is rotatably housed.

The base ring 85 is attached to the upper end of base tubular member 80" and comprising at least one sealing member 86 engageable with the main intermediate tubular member 70.

For example, the sealing member 86 is a gasket, in this case a lip gasket.

In the compact configuration the telescopic column is completely retracted, whereas in the extended configuration the column is completely elongated along the axis V. Intermediate configurations, i.e. partial extension or partial retraction, are also possible between the compact configuration and the extended configuration.

For the purposes of this discussion, the adjective "horizontal" is intended as an element arranged orthogonally to the axis V, and the adjective "vertical" is intended as an element arranged parallel to the axis V.

According to the present invention, in the compact configuration the driving screw 30 acts as a vertical latch which engages the head piston 51 and keeps the head horizontal latch 53 in the unlocked position. In this unlocked position, the head elastic member 54 is compressed between the head piston body 52 and the head horizontal latch 53, furthermore the head tubular member 50 is disengaged from the main intermediate tubular member 70.

In the movement of the telescopic column assembly 1 from the compact configuration to the extended configuration, the disengagement of the head piston 51 from the driving screw 30 allows the movement of the head horizontal latch 53 which, being activated by the elongation of the head elastic member 54, translates horizontally from the unlocked position to the locked position. In particular, when the head elastic member 54 relaxes to try to return to the rest position, the head horizontal latch 53 translates horizontally engaging the seat 73.

In the locked position, the head tubular member 50 is engaged and locked to the main intermediate tubular member 70 by engaging the head horizontal latch 53 in the respective seat 73.

In accordance with one embodiment, the telescopic column assembly 1 further comprises at least one secondary intermediate tube assembly 6 arranged between the main intermediate tube assembly 7 and the head tube assembly 5. In other words, the secondary intermediate tube assembly 6 follows the head tube assembly 5 and precedes the main intermediate tube assembly 7.

Such secondary intermediate tube assembly 6 in turn comprises a secondary intermediate tubular member 60, a secondary intermediate piston 61 and a secondary intermediate ring 65.

The secondary intermediate tubular member 60 extends between a lower end of secondary intermediate tubular member 60' and an upper end of secondary intermediate tubular member 60". Such secondary intermediate tubular member 60 has at least one latch seat 63'.

The secondary intermediate piston 61 may be engaged with the driving screw 30 and is attached to the lower end of secondary intermediate tubular member 60'. Said secondary intermediate piston 61 comprises a secondary intermediate piston body 62, at least one intermediate horizontal latch 63, and at least one intermediate elastic member 64 which elastically connects the secondary intermediate piston body 62 with the intermediate horizontal latch 63.

Preferably, the intermediate elastic member 64 is arranged orthogonally to the axis V.

The secondary intermediate ring 65 is attached to the upper end of secondary intermediate tubular member 60" and comprises at least one secondary intermediate sealing member 66 which may be engaged with the head tubular member 50.

Preferably, the secondary intermediate ring 65 does not protrude radially with respect to the secondary intermediate tubular member 60.

Preferably, the main intermediate ring 75 does not protrude radially with respect to the main intermediate tubular member 70.

Preferably, the base ring 85 does not protrude radially with respect to the tubular base member 80.

Advantageously, the telescopic column assembly is slim, since the radial dimension of each tube assembly is defined by the respective tubular member.

For example, the secondary intermediate sealing member 66 is a gasket, in this case a lip gasket.

In the compact configuration, the driving screw 30 acts as a vertical latch and engages both the head piston 51 and the secondary intermediate piston 61, so as to keep the head horizontal latch 53 in the unlocked position and the intermediate horizontal latch 63 in an inactive position.

In the unlocked position of the head horizontal latch 53, the head elastic member 54 is compressed between the head piston body 52 and the head horizontal latch 53, furthermore the head tubular member 50 is disengaged from the secondary intermediate tubular member 60.

In the inactive position of the intermediate horizontal latch 63, the intermediate elastic member 64 is compressed between the secondary intermediate piston body 62 and the intermediate horizontal latch 63, furthermore the secondary intermediate tubular member 60 is disengaged from the main intermediate tubular member 70.

In the movement of the telescopic column assembly 1 from the compact configuration to the extended configuration, the disengagement of the head piston 51 from the driving screw 30 allows the movement of the head horizontal latch 53. Such head horizontal latch 53, being activated by the elongation of the head elastic member 54, translates horizontally from the unlocked position to the locked position, in which the head tubular member 50 is locked to the secondary intermediate tubular member 60 by means of the engagement of the head horizontal latch 53 in the respective latch seat 63'. Furthermore, the subsequent disengagement of the secondary intermediate piston 61 from the driving screw 30 allows the intermediate horizontal latch 63, being activated by the elongation of the intermediate elastic member 64, to translate horizontally between the inactive position, in which the secondary intermediate tubular member 60 is disengaged from the main intermediate tubular member 70, and an active position, in which the secondary intermediate tubular member 60 is locked to the main intermediate tubular member 70 and the intermediate horizontal latch 63 engages the respective seat 73 obtained in the main intermediate tubular member 70.

For the purposes of this discussion, the generic term "horizontal latch" means the head horizontal latch 53 and/or the intermediate horizontal latch 63.

Advantageously, the telescopic column assembly according to the present invention allows the horizontal latch of a tubular member to lock such tubular member to the following one. On the contrary, according to the prior art, the horizontal latch of a tubular member allowed to block the extension of the preceding tubular member.

According to one embodiment, the telescopic column assembly 1 comprises at least two secondary intermediate tube assemblies 6 arranged successively, in particular housed concentrically one inside the other.

In the extended configuration, there being at least two secondary intermediate tube assemblies 6, the intermediate horizontal latch 63 of a first secondary intermediate tube assembly 6 preceding the main intermediate tube assembly 7 engages the seat 73.

Furthermore, the intermediate horizontal latch 63 of a second secondary intermediate tube assembly 6 following the head tube assembly 5 engages the latch seat 63' of the first secondary intermediate tube assembly. Finally, the head horizontal latch 53 of the head tube assembly 5 engages the latch seat 63' of the second secondary intermediate tube assembly.

For the purposes of this discussion, the generic expression "tube assembly" refers to any tube assembly of the plurality of tube assembly 4. In other words, the term "tube assembly" generically indicates the base tube assembly 8, or the main intermediate tube assembly 7, the secondary intermediate tube assembly 6 or the head tube assembly 5.

In the present description, the term "tubular member" generally refers to the base tubular member 80, or to the main intermediate tubular member 70, to the secondary intermediate tubular member 60 or to the head tubular member 50.

In one embodiment, the main intermediate sealing member 76 abuts the first secondary intermediate tube assembly, in particular it abuts the external surface of the secondary intermediate tubular member of said first secondary intermediate tube assembly. On the other hand, the secondary intermediate sealing member 66 of the first secondary intermediate tube assembly abuts the second secondary intermediate tube assembly, in particular it abuts the external surface of the secondary intermediate tubular member of said second secondary intermediate tube assembly. Finally, the secondary intermediate sealing member 66 of the second secondary intermediate tube assembly abuts the head tube assembly 5, in particular it abuts the external surface of the head tubular member 50.

According to one embodiment, the latch seat 63' is suitable for accommodating the head horizontal latch 53 or an intermediate horizontal latch 63 of a further secondary intermediate tube assembly 6.

According to one embodiment, in the inactive position of the intermediate horizontal latch 63, the secondary intermediate tubular member 60 is disengaged from a subsequent secondary intermediate tubular member 60 with a diameter greater than the one considered.

According to one embodiment, the head horizontal latch 53 and the intermediate horizontal latch 63 each comprise a head 530; 630, a ring 531; 631 and a body 532; 632.

The head 530; 630 is suitable for engaging the seat 73 and/or the latch seat 63'. Furthermore, such head 530; 630 has at least one housing hole 533; 633 where the head elastic member 54 or the intermediate elastic member 64 is at least partially housed.

The ring 531; 631 is slidably engageable to the driving screw 30. Such ring 531; 631, when engaged to the driving screw, defines the unlocked position of the head horizontal latch 53 and the inactive position of the intermediate horizontal latch 63.

The body 532; 632 has a reduced section with respect to the head 530; 630. Such body 532; 632 defines a ring seat 534; 634 where the ring 531; 631 is housed. In particular, the reduced section of the body 532; 632 is obtained along a plane having a cross-section which is orthogonal to the base plane B and parallel to the axis V.

According to one embodiment, the head 530; 630, the ring 531; 631 and body 532; 632 are made in one piece, i.e. integral with each other to form the head horizontal latch 53 or the intermediate horizontal latch 63. Alternatively, only the ring 531; 631 and body 532; 632 are made in one piece.

Preferably, there are two head horizontal latches 53 and they are diametrically opposite each other. These head horizontal latches 53 have an "L"-shaped axial cross-section, where such axial cross-section is obtained along a plane which is orthogonal to the base plane B and containing the axis V.

Preferably, there are two intermediate horizontal latches 63 and they are diametrically opposite each other. These intermediate horizontal latches 63 have an "L"-shaped axial cross-section, where such axial cross-section is obtained along a plane which is orthogonal to the base plane B and containing the axis V.

In particular, the head horizontal latch 53 is substantially identical to the intermediate horizontal latch 63, with the exception of diametrical or longitudinal geometric variations which however keep the proportions substantially unchanged.

In one embodiment, the ring 531; 631 is shaped so as to have a lower flared surface 535'; 635' which, in the movement of the telescopic column assembly 1 from the extended configuration to the compact configuration, acts as an opening for the driving screw 30.

The driving screw, engaging and crossing the ring 531; 631, moves the head horizontal latch 53 from the locked position to the unlocked position and/or the intermediate horizontal latch 63 from the active to the inactive position.

Optionally, the ring 531; 631 is shaped so as to also have an upper flared surface; 535"; 635".

According to one embodiment, the head piston body 52 and the secondary intermediate piston body 62 each comprise at least one abutment projection 520; 620 suitable for acting as an abutment point for the head elastic member 54 or the intermediate elastic member 64. The head elastic member 54, or the intermediate elastic member 64, is housed at a first end in the housing hole 533; 633 and at a second opposite end it abuts the abutment projection 520; 620.

Therefore, in the compact configuration, the head elastic member 54 and the intermediate elastic member 64 are compressed between the housing hole 533; 633 and the abutment projection 520; 620. On the other hand, in the extended configuration, the ring 531; 631 is disengaged from the driving screw 30 to allow the head elastic member 54 and the intermediate elastic member 64 to extend and cause the head horizontal latch 53 and of the intermediate horizontal latch 63 to translate and engage the latch seat 63' and the seat 73.

In one embodiment, the ring 531; 631 develops concentrically around a ring axis F; F' which is substantially coaxial to the axis V the telescopic column assembly is in a compact configuration. On the other hand, in the extended configuration, the ring axis F; F' is spaced transversely with respect to the axis V. In particular, in the extended configuration, the ring axis F; F' is spaced from the axis V along a direction which is orthogonal to that axis V.

According to one embodiment, the head piston 51 and the secondary intermediate piston 61 each comprise a guide band 57; 67 made of a material with a low coefficient of friction, for example a material belonging to the family of polymers. This guide band 57; 67 is suitable for sliding on the internal surface of the secondary intermediate tubular member 60 and/or of the main intermediate tubular member 70.

Preferably, the guide band 57; 67 is in the form of an open ring and is housed in a respective band seat 570; 670 obtained on the head piston body 52 or on the secondary intermediate piston body 62.

In one embodiment, the secondary intermediate tubular member 60 and the main intermediate tubular member 70 each comprise at least one lower external band 601; 701 respectively positioned on the external surface of the secondary intermediate tubular member 60 and of the main intermediate tubular member 70. This lower external band 601; 701 is made of a material with a low coefficient of friction, for example a material belonging to the family of polymers, and is suitable for sliding on the internal surface of a further secondary intermediate tubular member 60 and/or of the main intermediate tubular member 70 and/or of the base tubular member 80.

Preferably, the lower external band 601; 701 is positioned at the lower end of secondary intermediate tubular member 60' and at the lower end of main intermediate tubular member 70'.

According to one embodiment, the main intermediate tubular member 70 comprises two lower external bands 701.

In one embodiment comprising a plurality of secondary intermediate tube assemblies 6, the external lower bands 601 are positioned on the external surfaces of the secondary intermediate tubular members 60 and are transversely aligned along a transverse axis T which is orthogonal to the axis V. It should be clear that the external lower band 601 of a secondary intermediate tubular member 60 slides on the internal surface of the following secondary intermediate tubular member 60.

Optionally and according to one embodiment not shown in the figure, also the head tubular member 50 comprises a lower external head band which is positioned on the external surface of the head tubular member 50 and is suitable for sliding on the internal surface of the secondary intermediate tubular member 60 or of the main intermediate tubular member 70.

In accordance with one embodiment, the secondary intermediate tubular member 60, the main intermediate tubular member 70 and the base tubular member 80 each comprise an upper internal band 602; 702; 802 respectively arranged on the internal surface of the secondary intermediate tubular member 60, of the main intermediate tubular member 70 and of the base tubular member 80. This upper internal band 602; 702; 802 is made of a material with a low coefficient of friction, for example a material belonging to the family of polymers, and is suitable for sliding on the external surface of the head tubular member 50 and/or of the secondary intermediate tubular member 60 and/or of the main intermediate tubular member 70.

Preferably, this upper internal band 602; 702; 802 is arranged at the respective upper end of secondary intermediate tubular member 60", upper end of main intermediate tubular member 70" or upper end of base tubular member 80".

According to one embodiment, the head piston body 52 is provided with an abutment surface 510 suitable for abutting the upper internal band 602, so as to define the maximum extension of the head tubular member 50.

In one embodiment, the engagement between the lower external band 601 of the secondary intermediate tubular member 60 with the upper internal band 602 of a subsequent secondary intermediate tubular member defines the maximum extension of the secondary intermediate tubular member 60. Furthermore, the engagement between the lower external band 601 of the subsequent secondary intermediate tubular member with the upper internal band 702 of the main intermediate tubular member 70 defines the maximum extension of the subsequent secondary intermediate tubular member. Finally, the engagement between the lower external band 701 of the main intermediate tubular member 70 with the upper internal band 802 of the base tubular member 80 defines the maximum extension of the main intermediate tubular member 70.

According to one embodiment, the driving screw 30 comprises a threaded portion 30" whose height along the axis V is substantially the same as the height of the head tubular member 50 so that, upon completion of the extension of the head tubular member, the head tube assembly 5 allows the secondary intermediate piston 61 or the main intermediate piston 71 to engage the driving screw 30.

Preferably, the driving screw 30 also comprises a non-threaded, i.e. smooth, portion 30'.

In one embodiment, at the upper end of head tubular member 50" there is a coupling member 55 for the installation of military, communication, lighting and/or surveillance equipment.

According to one embodiment, the movement means 3 also comprise a transmission system 31 for returning motion to the driving screw 30 and a transducer 32, for example a multi-turn absolute encoder, engaged to said transmission system 31.

Optionally, the movement means further comprise an electric motor, a converter, a controller, a brake and a reducer which are operatively connected to the transmission system 31.

In accordance with the present invention, the method of extending the telescopic column assembly 1 comprises the following steps:

a) activating the rotation of the driving screw 30;

b) starting the extension of the head tube assembly 5 engaged with the driving screw by means of the head piston 51, so as to keep the head horizontal latch 53 in the unlocked position;

c) completing the extension of the head tube assembly 5, wherein the disengagement of the head piston 51 from the driving screw 30 allows the head horizontal latch 53 to translate to the locked position, in which the head tubular member 50 is locked to the secondary intermediate tubular member 60 by engaging the head horizontal latch 53 in the respective latch seat 63';

d) starting the extension of the secondary intermediate tube assembly 6 arranged between the main intermediate tube assembly 7 and the head tube assembly 5. Such secondary intermediate tube assembly 6 is engaged with the driving screw by means of a secondary intermediate piston 61, so as to keep the intermediate horizontal latch 63 in an inactive position;

e) completing the extension of the secondary intermediate tube assembly 6, wherein the disengagement of the secondary intermediate piston 61 from the driving screw (30) allows the intermediate horizontal latch 63 to be moved into the active position, in which the secondary intermediate tubular member 60 is locked to the main intermediate tubular member 70 and the intermediate horizontal latch 63 engages the respective seat 73;

f) extending the main intermediate tube assembly 7 which remains engaged with the driving screw 30 even when the telescopic column assembly 1 is fully extended.

For the purposes of this discussion, the term "piston" generally indicates the head piston 51, the main intermediate piston 71 or the secondary intermediate piston 61. Each piston comprises a nut screw that may be engaged with the driving screw 30.

During the extension n of the telescopic column assembly 1 and before the head tube assembly 5 has completed its stroke, the abutment between the head piston body 52 and the upper internal band 602 of the subsequent secondary intermediate tubular member allows the secondary intermediate tube assembly 6 to engage with the driving screw 30 and extend together with the head tube assembly 5. Upon completion of the extension of the head tube assembly 5, the disengagement of the head piston 51 from the driving screw 30 allows the head horizontal latch 53 to translate into the locked position.

It should become apparent to those skilled in the art that the operation of the extension of the subsequent intermediate secondary tube assemblies 6 is substantially similar to that of the head tube assembly 5.

In accordance with the present invention, the method of retracting a telescopic column assembly 1 comprises the following steps:

activating the rotation of the driving screw 30;

retracting the main intermediate tube assembly 7 engaged with the driving screw 30;

engaging the secondary intermediate piston 61 with the driving screw 30, so as to return the intermediate horizontal latch 63 to the inactive position, in which the secondary intermediate tubular member 60 is released from the main intermediate tubular member 70;

retracting the secondary intermediate tube assembly 6;

engaging the head piston 51 with the driving screw 30, so as to return the head horizontal latch 53 to the unlocked position, in which the head tubular member 50 is disengaged from the secondary intermediate tubular member 60;

retracting the head tube assembly 5, so as to bring the telescopic column assembly 1 into a compact configuration.

Furthermore, it should be clear to those skilled in the art that in the case in which the telescopic column assembly 1 comprises a plurality of secondary intermediate tube assemblies 6, the operation for the extension and retraction of the telescopic column assembly 1 is, mutatis mutandis, the same as the one described hereinabove.

Innovatively, the telescopic column assembly fulfills the intended purpose. In particular, the locking of one extension with respect to the following one takes place through a translation of the horizontal latch "from the inside to the outside".

Advantageously, the plurality of tube assemblies has a radial dimension which is substantially the same as that of each tubular member. In other words, there are no radially projecting external rings.

According to an advantageous aspect, the telescopic column assembly is protected from external atmospheric agents, in fact the presence of the main intermediate sealing member, of the secondary intermediate sealing member and of the sealing member prevents sand, snow, rain, debris to enter between a tubular member and the following one. In this way, the perfect functionality of the column is always guaranteed.

To the embodiments of the telescopic column assembly according to the invention, in order to meet contingent needs, a person skilled in the art may make several changes, adaptations, and replacements of elements with other functionally equivalent ones, without departing from the scope of protection of the following claims. Each of the features described as belonging to a possible embodiment may be obtained independently of the other described embodiments.

What is claimed is:

1. An electromechanical telescopic column assembly for supporting and moving military, communication, lighting and/or surveillance equipment, extending along an axis (V) and comprising:

a base suitable to be placed on a base plane;

movement means comprising a driving screw oriented along the axis (V), and a plurality of tube assemblies telescopically configured configurable along the axis (V) between a compact configuration and an extended configuration, said plurality of tube assemblies comprising:

i) a head tube assembly comprising:

a head tubular member extending between a lower end of head tubular member and an upper end of head tubular member; and a head piston attached to the lower end of head tubular member and engageable to the driving screw, wherein the head piston comprises a head piston body, at least one head horizontal latch, and at least one head elastic member that elastically connects the head piston body to the head horizontal latch, so as to cause a movement of the head horizontal latch;

ii) a main intermediate tube assembly comprising:

a main intermediate tubular member extending between a lower end of main intermediate tubular member and an upper end of main intermediate tubular member, said main intermediate tubular member comprising at least one seat suitable for receiving the head horizontal latch;

a main intermediate piston engaged to the driving screw and attached to the lower end of main intermediate tubular member; and a main intermediate ring attached to the upper end of main intermediate tubular member and comprising at least one main intermediate sealing member engageable with the head tubular member; and iii) a base tube assembly comprising:

a base tubular member extending between a lower end of base tubular member and an upper end of base tubular member;

a bottom attached to the base and having a hole where the driving screw is rotatably housed; and a base ring attached to the upper end of base tubular member and comprising at least one sealing member engageable with the main intermediate tubular member, wherein, in the compact configuration, the driving screw acts as a vertical latch which engages the head piston and keeps the head horizontal latch in an unlocked position, in which the head elastic member is compressed between the head piston body and the head horizontal latch and in which the head tubular member is disengaged from the main intermediate tubular member, and wherein, in a movement of the electromechanical telescopic column assembly from the compact configuration to the extended configuration, a disengagement of the head piston from the driving screw allows the movement of the head horizontal latch which, being activated by an elongation of the head elastic member, translates horizontally from the unlocked position to a locked position, in which the head tubular member is locked to the main intermediate tubular member by an engagement of the head horizontal latch in a respective seat.

2. The electromechanical telescopic column assembly of claim 1, further comprising at least one secondary intermediate tube assembly arranged between the main intermediate tube assembly and the head tube assembly, said secondary intermediate tube assembly comprising:

secondary intermediate tubular member extending between a lower end of secondary intermediate tubular member and an upper end of secondary intermediate tubular member, said secondary intermediate tubular member comprising at least one bolt latch seat;

a secondary intermediate piston engageable to the driving screw and attached to the lower end of secondary intermediate tubular member, wherein said secondary intermediate piston comprises a secondary intermediate piston body, at least one intermediate horizontal latch, and at least one intermediate elastic member elastically connecting the secondary intermediate piston body and the intermediate horizontal latch to each other;

a secondary intermediate ring attached to the upper end of secondary intermediate tubular member and comprising at least one secondary intermediate sealing member engageable with the head tubular member, wherein, in the compact configuration, the driving screw acts as a vertical latch and engages both the head piston and the secondary intermediate piston, so as to keep the head horizontal latch in the unlocked position, wherein the head elastic member is compressed between the head piston body and the head horizontal latch and wherein the head tubular member is disengaged from the secondary intermediate tubular member, b) the intermediate horizontal latch in an inactive position, wherein the intermediate elastic member is compressed between the secondary intermediate piston body and the intermediate horizontal latch and wherein the secondary intermediate tubular member is disengaged from the main intermediate tubular member, and wherein, when moving the electromechanical telescopic column assembly from the compact configuration to the extended configuration:

the disengagement of the head piston from the driving screw allows the movement of the head horizontal latch which, being activated by the elongation of the head elastic member, translates horizontally from the unlocked position to the locked position, in which the head tubular member is locked to the secondary intermediate tubular member by an engagement of the head horizontal latch in a respective latch seat, a subsequent disengagement of the secondary intermediate piston from the driving screw allows the intermediate horizontal latch, being activated by an elongation of the intermediate elastic member, to translate horizontally between the inactive position, in which the secondary intermediate tubular member is disengaged from the main intermediate tubular member, and an active position, in which the secondary intermediate tubular member is locked to the main intermediate tubular member and the intermediate horizontal latch engages the respective seat provided in the main intermediate tubular member.

3. The electromechanical telescopic column assembly of claim 2, comprising at least two secondary intermediate tube assemblies arranged successively, so that in the extended configuration:

the intermediate horizontal latch of a first secondary intermediate tube assembly preceding the main intermediate tube assembly engages the seat;

the intermediate horizontal latch of a second secondary intermediate tube assembly following the head tube assembly engages the latch seat of the first secondary intermediate tube assembly; and the head horizontal latch of the head tube assembly engages the latch seat of the second secondary intermediate tube assembly.

4. The electromechanical telescopic column assembly of claim 2, wherein the head horizontal latch and the intermediate horizontal latch each comprise:

a head suitable for engaging the seat and/or the latch seat, said head having at least one housing hole where the head elastic member or the intermediate elastic member are at least partially housed;

a ring slidably engageable to the driving screw, said ring, when engaged to the driving screw, defining the unlocked position of the head horizontal latch and the inactive position of the intermediate horizontal latch; and a body having a reduced section with respect to the head, said body defining a ring seat where the ring is housed.

5. The electromechanical telescopic column assembly of claim 4, wherein the head, the ring and the body are made in one piece to form the head horizontal latch or the intermediate horizontal latch, or only the ring and the body are made in one piece.

6. The electromechanical telescopic column assembly of claim 4, wherein the ring is shaped to have a lower flared surface which, in a movement of the electromechanical telescopic column assembly from the extended configuration to the compact configuration, acts as an opening for the driving screw, and wherein said driving screw, engaging and crossing the ring, moves the head horizontal latch from the locked position to the unlocked position and/or the intermediate horizontal latch from the active position to the inactive position.

7. The electromechanical telescopic column assembly of claim 4, wherein the head piston body and the secondary intermediate piston body each comprise at least one abutment projection suitable to act as an abutment point for the head elastic member or the intermediate elastic member, said head elastic member or intermediate elastic member being at a first end housed in the housing hole and at a second opposite end being in abutment with the abutment projection, so that:

in the compact configuration, the head elastic member and the intermediate elastic member are compressed between the housing hole and the abutment projection, and in the extended configuration, the ring is disengaged from the driving screw to allow the head elastic member and the intermediate elastic member to extend, so as to cause the head horizontal latch and the intermediate horizontal latch to translate and engage the latch seat and the seat.

8. The electromechanical telescopic column assembly of claim 4, wherein the ring develops concentrically around a ring axis that is substantially coaxial to the axis (V) when the electromechanical telescopic column assembly is in the compact configuration, and wherein when the electromechanical telescopic column assembly is in the extended configuration, the ring axis is spaced transversely to the axis (V).

9. The electromechanical telescopic column assembly of claim 2, wherein the head piston and the secondary intermediate piston each comprise a guide band made of a material with a low coefficient of friction, optionally the material with a low coefficient of friction being a material belonging to the family of polymers, said guide band being suitable for sliding on an internal surface of the secondary intermediate tubular member and/or of the main intermediate tubular member.

10. The electromechanical telescopic column assembly of claim 2, wherein the secondary intermediate tubular member and the main intermediate tubular member each comprise at least one lower external band respectively positioned on an external surface of the secondary intermediate tubular member and of the main intermediate tubular member, said lower external band being made of a material with a low coefficient of friction, optionally the material with a low coefficient of friction being a material belonging to the family of polymers, and being suitable for sliding on an internal surface of a further secondary intermediate tubular member and/or of the main intermediate tubular member and/or of the base tubular member.

11. The electromechanical telescopic column assembly of claim 2, wherein the secondary intermediate tubular member, the main intermediate tubular member and the base tubular member each comprise an upper internal band respectively arranged on an internal surface of the secondary intermediate tubular member, of the main intermediate tubular member and of the base tubular member, said upper internal band being made of a material with a low coefficient of friction, optionally the material with a low coefficient of friction being a material belonging to the family of polymers, and being suitable for sliding on an external surface of the head tubular member and/or of the secondary intermediate tubular member and/or of the main intermediate tubular member.

12. The electromechanical telescopic column assembly of claim 11, wherein the head piston body is provided with an abutment surface suitable for abutting the upper internal band of the secondary intermediate tubular member, so as to define a maximum extension of the head tubular member.

13. The electromechanical telescopic column assembly of claim 10, wherein the secondary intermediate tubular member, the main intermediate tubular member and the base tubular member each comprise an upper internal band respectively arranged on the internal surface of the secondary intermediate tubular member, of the main intermediate tubular member and of the base tubular member, said upper internal band being made of a material with a low coefficient of friction, optionally the material with a low coefficient of friction being a material belonging to the family of polymers, and being suitable for sliding on an external surface of the head tubular member and/or the external surface of the secondary intermediate tubular member and/or of the main intermediate tubular member, and wherein an engagement between the lower external band of the secondary intermediate tubular member with the upper internal band of a subsequent secondary intermediate tubular member, defines a maximum extension of the secondary intermediate tubular member;

an engagement between the lower external band of the subsequent secondary intermediate tubular member with the upper internal band of the main intermediate tubular member defines a maximum extension of the subsequent secondary intermediate tubular member; and an engagement between the lower external band of the main intermediate tubular member with the upper internal band of the base tubular member defines a maximum extension of the main intermediate tubular member.

14. The electromechanical telescopic column assembly of claim 2, wherein the driving screw comprises a threaded portion whose height along the axis (V) is substantially the same as a height of the head tubular member so that, upon completion of an extension of the head tubular member, the head tube assembly allows the secondary intermediate piston or the main intermediate piston to engage the driving screw.

15. The electromechanical telescopic column assembly of claim 1, wherein at the upper end of head tubular member there is a coupling member for installation of the military, communication and lighting and/or surveillance equipment is provided.

16. The electromechanical telescopic column assembly of claim 1, wherein the movement means further comprise a transmission system for returning motion to the driving screw and a transducer, the transducer optionally being a multi-turn absolute encoder, engaged to said transmission system.

17. A method of extending an electromechanical telescopic column assembly for supporting and moving military, communication, lighting and/or surveillance equipment, extending along an axis (V) and comprising:

a base suitable to be placed on a base plane;

movement means comprising a driving screw oriented along the axis (V), and a plurality of tube assemblies telescopically configurable along the axis (V) between a compact configuration and an extended configuration, said plurality of tube assemblies comprising:

i) a head tube assembly comprising:

a head tubular member extending between a lower end of head tubular member and an upper end of head tubular member; and a head piston attached to the lower end of head tubular member and engageable to the driving screw, wherein the head piston comprises a head piston body, at least one head horizontal latch, and at least one head elastic member that elastically connects the head piston body to the head horizontal latch, so as to cause a movement of the head horizontal latch;

ii) a main intermediate tube assembly comprising:

a main intermediate tubular member extending between a lower end of main intermediate tubular member and an upper end of main intermediate tubular member, said main intermediate tubular member comprising at least one seat suitable for receiving the head horizontal latch;

a main intermediate piston engaged to the driving screw and attached to the lower end of main intermediate tubular member; and a main intermediate ring attached to the upper end of main intermediate tubular member and comprising at least one main intermediate sealing member engageable with the head tubular member; and iii) a base tube assembly comprising:

a base tubular member extending between a lower end of base tubular member and an upper end of base tubular member;

a bottom attached to the base and having a hole where the driving screw is rotatably housed; and a base ring attached to the upper end of base tubular member and comprising at least one sealing member engageable with the main intermediate tubular member, wherein, in the compact configuration, the driving screw acts as a vertical latch which engages the head piston and keeps the head horizontal latch in an unlocked position, in which the head elastic member is compressed between the head piston body and the head horizontal latch and in which the head tubular member is disengaged from the main intermediate tubular member, and wherein, in a movement of the electromechanical telescopic column assembly from the compact configuration to the extended configuration, a disengagement of the head piston from the driving screw allows the movement of the head horizontal latch which, being activated by an elongation of the head elastic member, translates horizontally from the unlocked position to a locked position, in which the head tubular member is locked to the main intermediate tubular member by an engagement of the head horizontal latch in a respective seat, the electromechanical telescopic column assembly further comprising at least one secondary intermediate tube assembly arranged between the main intermediate tube assembly and the head tube assembly, said secondary intermediate tube assembly comprising:

a secondary intermediate tubular member extending between a lower end of secondary intermediate tubular member and an upper end of secondary intermediate tubular member, said secondary intermediate tubular member comprising at least one latch seat;

a secondary intermediate piston engageable to the driving screw and attached to the lower end of secondary intermediate tubular member, wherein said secondary intermediate piston comprises a secondary intermediate piston body, at least one intermediate horizontal latch, and at least one intermediate elastic member elastically connecting the secondary intermediate piston body and the intermediate horizontal latch to each other;

a secondary intermediate ring attached to the upper end of secondary intermediate tubular member and comprising at least one secondary intermediate sealing member engageable with the head tubular member, wherein, in the compact configuration, the driving screw acts as a vertical latch and engages both the head piston and the secondary intermediate piston, so as to keep the head horizontal latch in the unlocked position, wherein the head elastic member is compressed between the head piston body and the head horizontal latch and wherein the head tubular member is disengaged from the secondary intermediate tubular member, the intermediate horizontal latch in an inactive position, wherein the intermediate elastic member is compressed between the secondary intermediate piston body and the intermediate horizontal latch and wherein the secondary intermediate tubular member is disengaged from the main intermediate tubular member, and wherein, when moving the electromechanical telescopic column assembly from the compact configuration to the extended configuration:

the disengagement of the head piston from the driving screw allows the movement of the head horizontal latch which, being activated by the elongation of the head elastic member, translates horizontally from the unlocked position to the locked position, in which the head tubular member is locked to the secondary intermediate tubular member by an engagement of the head horizontal latch in a respective latch seat, a subsequent disengagement of the secondary intermediate piston from the driving screw allows the intermediate horizontal latch, being activated by an elongation of the intermediate elastic member, to translate horizontally between the inactive position, in which the secondary intermediate tubular member is disengaged from the main intermediate tubular member, and an active position, in which the secondary intermediate tubular member is locked to the main intermediate tubular member and the intermediate horizontal latch engages the respective seat provided in the main intermediate tubular member, the method comprising:

activating a rotation of the driving screw;

starting an extension of the head tube assembly engaged with the driving screw the head piston, so as to keep the head horizontal latch in the unlocked position;

completing the extension of the head tube assembly, wherein the disengagement of the head piston from the driving screw allows the head horizontal latch to translate to the locked position, in which the head tubular member is locked to the secondary intermediate tubular member by the engagement of the head horizontal latch in the respective latch seat;

starting an extension of the secondary intermediate tube assembly arranged between the main intermediate tube assembly and the head tube assembly, said secondary intermediate tube assembly being engaged with the driving screw by the secondary intermediate piston, so as to keep the intermediate horizontal latch in the inactive position;

completing the extension of the secondary intermediate tube assembly, wherein the disengagement of the secondary intermediate piston from the driving screw allows the intermediate horizontal latch to be moved into the active position, in which the secondary intermediate tubular member is locked to the main intermediate tubular member and the intermediate horizontal latch engages the respective seat; and extending the main intermediate tube assembly which remains engaged with the driving screw even when the electromechanical telescopic column assembly is fully extended.

18. A method of retracting a telescopic column assembly for supporting and moving military, communication, lighting and/or surveillance equipment, extending along an axis (V) and comprising:

a base suitable to be placed on a base plane;

movement means comprising a driving screw oriented along the axis (V), and a plurality of tube assemblies telescopically configurable along the axis (V) between a compact configuration and an extended configuration, said plurality of tube assemblies comprising:

i) a head tube assembly comprising:

a head tubular member extending between a lower end of head tubular member and an upper end of head tubular member; and a head piston attached to the lower end of head tubular member and engageable to the driving screw, wherein the head piston comprises a head piston body, at least one head horizontal latch, and at least one head elastic member that elastically connects the head piston body to the head horizontal latch, so as to cause a movement of the head horizontal latch;

ii) a main intermediate tube assembly comprising:

a main intermediate tubular member extending between a lower end of main intermediate tubular member and an upper end of main intermediate tubular member, said main intermediate tubular member comprising at least one seat suitable for receiving the head horizontal latch;

a main intermediate piston engaged to the driving screw and attached to the lower end of main intermediate tubular member; and a main intermediate ring attached to the upper end of main intermediate tubular member and comprising at least one main intermediate sealing member engageable with the head tubular member; and iii) a base tube assembly comprising:

a base tubular member extending between a lower end of base tubular member and an upper end of base tubular member;

a bottom attached to the base and having a hole where the driving screw is rotatably housed; and a base ring attached to the upper end of base tubular member and comprising at least one sealing member engageable with the main intermediate tubular member, wherein, in the compact configuration, the driving screw acts as a vertical latch which engages the head piston and keeps the head horizontal latch in an unlocked position, in which the head elastic member is compressed between the head piston body and the head horizontal latch and in which the head tubular member is disengaged from the main intermediate tubular member, and wherein, in a movement of the electromechanical telescopic column assembly from the compact configuration to the extended configuration, a disengagement of the head piston from the driving screw allows the movement of the head horizontal latch which, being activated by an elongation of the head elastic member, translates horizontally from the unlocked position to a locked position, in which the head tubular member is locked to the main intermediate tubular member by an engagement of the head horizontal latch in a respective seat, the electromechanical telescopic column assembly further comprising at least one secondary intermediate tube assembly arranged between the main intermediate tube assembly and the head tube assembly, said secondary intermediate tube assembly comprising:

a secondary intermediate tubular member extending between a lower end of secondary intermediate tubular member and an upper end of secondary intermediate tubular member, said secondary intermediate tubular member comprising at least one latch seat;

a secondary intermediate piston engageable to the driving screw and attached to the lower end of secondary intermediate tubular member, wherein said secondary intermediate piston comprises a secondary intermediate piston body, at least one intermediate horizontal latch, and at least one intermediate elastic member elastically connecting the secondary intermediate piston body and the intermediate horizontal latch to each other;

a secondary intermediate ring attached to the upper end of secondary intermediate tubular member and comprising at least one secondary intermediate sealing member engageable with the head tubular member, wherein, in the compact configuration, the driving screw acts as a vertical latch and engages both the head piston and the secondary intermediate piston, so as to keep the head horizontal latch in the unlocked position, wherein the head elastic member is compressed between the head piston body and the head horizontal latch and wherein the head tubular member is disengaged from the secondary intermediate tubular member, the intermediate horizontal latch in an inactive position, wherein the intermediate elastic member is compressed between the secondary intermediate piston body and the intermediate horizontal latch and wherein the secondary intermediate tubular member is disengaged from the main intermediate tubular member, and wherein, when moving the electromechanical telescopic column assembly from the compact configuration to the extended configuration:

the disengagement of the head piston from the driving screw allows the movement of the head horizontal latch which, being activated by the elongation of the head elastic member, translates horizontally from the unlocked position to the locked position, in which the head tubular member is locked to the secondary intermediate tubular member by an engagement of the head horizontal latch in a respective latch seat, a subsequent disengagement of the secondary intermediate piston from the driving screw allows the intermediate horizontal latch, being activated by an elongation of the intermediate elastic member, to translate horizontally between the inactive position, in which the secondary intermediate tubular member is disengaged from the main intermediate tubular member, and an active position, in which the secondary intermediate tubular member is locked to the main intermediate tubular member and the intermediate horizontal latch engages the respective seat provided in the main intermediate tubular member, the method comprising:

activating a rotation of the driving screw;

retracting the main intermediate tube assembly engaged with the driving screw;

engaging the secondary intermediate piston with the driving screw, so as to return the intermediate horizontal latch to the inactive position, in which the secondary intermediate tubular member is released from the main intermediate tubular member;

retracting the secondary intermediate tube assembly;

engaging the head piston with the driving screw, so as to return the head horizontal latch to the unlocked position, in which the head tubular member is disengaged from the secondary intermediate tubular member; and retracting the head tube assembly, so as to bring the telescopic column assembly into the compact configuration.

* * * * *